(12) United States Patent
Lee et al.

(10) Patent No.: US 12,365,262 B2
(45) Date of Patent: Jul. 22, 2025

(54) ELECTRIFIED VEHICLE AND POWER MANAGEMENT METHOD THEREFOR

(71) Applicants: HYUNDAI MOTOR COMPANY, Seoul (KR); KIA CORPORATION, Seoul (KR)

(72) Inventors: Won Jae Lee, Suwon-si (KR); Gi Young Kwon, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 309 days.

(21) Appl. No.: 18/076,802

(22) Filed: Dec. 7, 2022

(65) Prior Publication Data

US 2024/0034188 A1    Feb. 1, 2024

(30) Foreign Application Priority Data

Jul. 26, 2022   (KR) .................. 10-2022-0092618

(51) Int. Cl.
*B60L 53/80*    (2019.01)
*B60L 15/20*    (2006.01)

(52) U.S. Cl.
CPC .............. *B60L 53/80* (2019.02); *B60L 15/20* (2013.01)

(58) Field of Classification Search
CPC .......... B60L 53/80; B60L 15/20; B60L 58/13; B60L 58/18; B60L 50/60; B60K 1/04; B60K 2001/0455; B60Y 2200/91; B60Y 2400/112; B60Y 2400/61; Y02T 10/70; Y02T 10/72
See application file for complete search history.

(56) References Cited

U.S. PATENT DOCUMENTS

| | | | | |
|---|---|---|---|---|
| 2012/0248868 | A1* | 10/2012 | Mobin | B60L 50/30 414/589 |
| 2013/0177795 | A1* | 7/2013 | Power | H01M 50/271 29/623.5 |
| 2016/0272085 | A1* | 9/2016 | Dai | B60H 1/00571 |
| 2017/0355274 | A1* | 12/2017 | Ger | B60L 53/80 |
| 2020/0094687 | A1* | 3/2020 | Ing | B60L 53/22 |

(Continued)

FOREIGN PATENT DOCUMENTS

| | | | | |
|---|---|---|---|---|
| GB | 2570870 A | * | 8/2019 | .............. B60L 53/80 |
| KR | 20120031611 A | | 4/2012 | |
| WO | WO-2016086274 A1 | * | 6/2016 | ............... B60K 1/04 |

(Continued)

*Primary Examiner* — Calvin Cheung
(74) *Attorney, Agent, or Firm* — Lempia Summerfield Katz LLC

(57) ABSTRACT

Disclosed is a method for power management of an electrified vehicle. In particular, the electrified vehicle comprises a power electric unit having a motor and an inverter and a main battery and a swappable battery electrically connected to the power electric unit. The method includes: determining a driver demand power when the power electric unit is generated; and satisfying the driver demand power first with the output of the swappable battery when the power electric unit outputs the driving force, and charging the main battery first in response to the driver demand power when the power electric unit is generated, based on the upper limit of charging and discharging of the main battery and the swappable battery.

16 Claims, 2 Drawing Sheets

(56) References Cited

U.S. PATENT DOCUMENTS

2020/0161876 A1* 5/2020 Dawn .................. H02J 7/0014
2022/0158261 A1* 5/2022 Beeney ................. B60L 50/66

FOREIGN PATENT DOCUMENTS

| WO | WO-2019018679 A1 * | 1/2019 | ............... B60K 1/04 |
| WO | WO-2020156771 A1 * | 8/2020 | .............. B60L 50/60 |
| WO | WO-2021021874 A1 * | 2/2021 | ................ B60L 3/12 |

* cited by examiner

ELECTRIFIED VEHICLE AND POWER MANAGEMENT METHOD THEREFOR

CROSS REFERENCE TO RELATED APPLICATION

The present application claims priority to Korean Patent Application No. 10-2022-0092618, filed Jul. 26, 2022, the entire contents of which are incorporated herein for all purposes by reference.

BACKGROUND

Field

The present disclosure relates to an electrified vehicle and a power management method therefor capable of compensating for charging and discharging between a main battery and a swappable battery.

Description of the Related Art

Recently, an increased interest in the environment causes more attention to electrified vehicles having an electric motor as a power source.

Although many electrified vehicle users have driving patterns centered on a short-distanced urban area, since the battery charging time for such electrified vehicles is relatively longer compared to the refueling time of internal combustion engine vehicles, the maximum travel distance of the electric vehicle (EV) that is driven by one full charge is important.

However, when the battery capacity is increased in order to maximize the travel distance of the EV, the weight of the vehicle is increased as well as the battery price in an electrified vehicle. Thus, the price of the vehicle is also significantly increased. To solve the problems such as reduced travel distance and the charging time due to the battery deterioration, a method that is capable of the battery being detachable is considered.

We have found that it is desired for developing a strategy for battery charging or discharging by a regenerative braking, and a strategy for controlling charging and discharging between two batteries.

The foregoing information is provided to enhance the understanding of the background of the present disclosure, Thus, it is not intended to mean that the information in this section is already known to those having ordinary skill in the art.

SUMMARY

The present disclosure provides an electrified vehicle and a power management method therefor, capable of satisfying in various environments compared to a vehicle provided only a single battery by compensating for charging and discharging between a main battery and a swappable battery in a structure in which the swappable battery is additionally equipped with the main battery.

Technical objects to be achieved by the present disclosure are not limited to the technical objects described above, and other technical objects not described should be clearly understood by those having ordinary skill in the art to which the present disclosure pertains.

To accomplish the above objects, according to one aspect of the present disclosure, there is provided a method for power management of an electrified vehicle. The electrified vehicle comprises a power electric unit having a motor and an inverter and a main battery and a swappable battery electrically connected to the power electric unit. The method comprises: determining a driver demand power when the power electric unit generates electric energy and satisfying the driver demand power first with the output of the swappable battery when the power electric unit outputs the driving force, and charging the main battery first in response to the driver demand power when the power electric unit is generated, based on the upper limits of charging and discharging of the main battery and the swappable battery.

In one embodiment, the method may further comprise discharging the swappable battery by the upper limit of discharging, and discharging the main battery by the value obtained by subtracting the upper limit of discharging of the swappable battery from the driver demand power, when the driver demand power exceeds the discharging upper limit of discharging of the swappable battery in the case of the power electric unit outputs the driving force.

In one embodiment, the method may further comprise determining whether the main battery is in a state of charging and discharging when the driver demand power is less than the discharge upper limit of the swappable battery.

In one embodiment, the method may further comprise discharging the swappable battery in response to the driver demand power when determined that the main battery cannot be charged or discharged.

In one embodiment, the method may further comprise: discharging the swappable battery to the upper limit of discharging, and charging the main battery by a value obtained by subtracting the driver demand power from the upper limit of discharging of the swappable battery, when determined that the main battery is in a state of chargeable and not chargeable.

In one embodiment, the method further comprises: charging the swappable battery by the upper limit of charging, and charging the main battery by the value obtained by subtracting the upper limit of charging of the main battery from the driver demand power, when the driver demand power exceeds the upper limit of charging of the main battery in the case of the power electric unit is generated.

In one embodiment, the method may further comprise charging the main battery in response to the driver demand power, when the upper limit of charging of the main battery is less than the driver demand power.

In an embodiment of the present disclosure, an electrified vehicle comprises: a power electric unit having a motor and an inverter; and a main battery and a swappable battery electrically connected to the power electric unit; and a vehicle control unit that determines the driver demand power, matches the driver demand power first with the output of the swappable battery when the power electric unit outputs the driving force, and charges the main battery first in response to the driver demand power when the power electric unit is generated, based on the upper limits of charging and discharging of the main battery and the swappable battery.

In one embodiment, the vehicle control unit may discharge the main battery by a value obtained by subtracting the upper limit of discharging of the swappable battery from the driver demand power, when the driver demand power exceeds the upper limit of discharging of the swappable battery in the case of the power electric unit outputs the driving force.

In one embodiment, the vehicle control unit may determine whether the main battery is in a state of charging and discharging when the driver demand power is less than the discharge upper limit of the swappable battery.

In one embodiment, the vehicle control unit may discharge the swappable battery in response to the driver demand power when determined that the main battery cannot be charged or discharged.

In one embodiment, the vehicle control unit may discharge the swappable battery to the upper limit of discharging, and charge the main battery by a value obtained by subtracting the driver demand power from the upper limit of discharging of the swappable battery, when determined that the main battery is in a state of chargeable and not chargeable.

In one embodiment, the vehicle control unit may charge the main battery by the upper limit of charging, and charge the main battery by the value obtained by subtracting the upper limit of charging of the main battery from the driver demand power, when the driver demand power exceeds the upper limit of charging of the main battery in the case of the power electric unit is generated.

In one embodiment, the vehicle control unit may charge the main battery in response to the driver demand power, when the upper limit of charging of the main battery is less than the driver demand power.

In one embodiment, the vehicle control unit determines whether the driver demand power exceeds the upper limit of output of a motor, and the power electric unit may output the upper limit of the motor when the driver demand power exceeds the upper limit of output of the motor.

According to various embodiments of the present disclosure as described above, in a structure in which the swappable battery is additionally equipped with the main battery, charging and discharging between the main battery and the swappable battery may be compensated, thereby satisfying the output in various environments as compared with a vehicle including only a single battery.

It should be appreciated by persons of ordinary skilled in the art that that the effects that can be achieved with the present disclosure are not limited to what has been particularly described herein above and other advantages of the present disclosure should be more clearly understood from the following detailed description taken in conjunction with the accompanying drawings.

Figure 1:
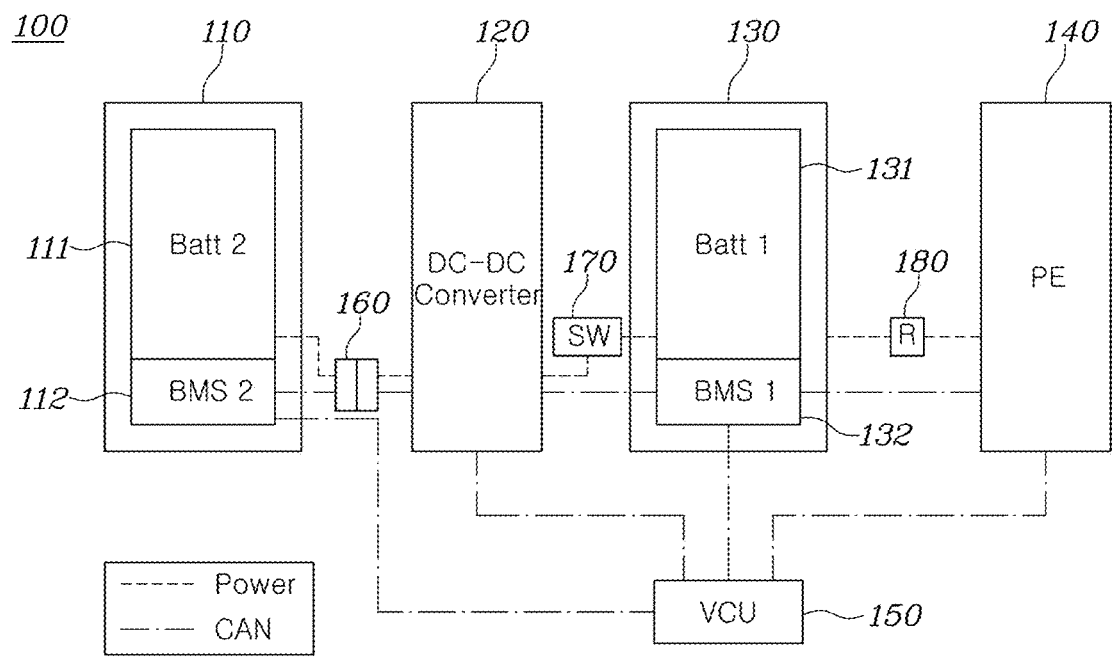
FIG. 1 is a block diagram illustrating an electrified vehicle equipped with a swappable battery according to an embodiment of the present disclosure.

The drawings described herein are for illustration purposes only and are not intended to limit the scope of the present disclosure in any way.

DETAILED DESCRIPTION

Hereinafter, embodiments of the present disclosure are described in greater detail with reference to the accompanying drawings. In describing the present disclosure, for ease of understanding, the same reference numerals are used to denote the same components throughout the drawings, and repetitive description on the same components has been omitted. In the following description, with respect to constituent elements used in the following description, suffixes "module" and "unit" are given in consideration of only facilitation of description and do not have meaning or functions discriminated from each other. In addition, in the following description of the embodiments disclosed in the present specification, a detailed description of known functions and configurations incorporated herein has been omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and spirit of the present disclosure.

Terms such as "first" and "second" may be used to describe various components, but the components should not be limited by the above terms. In addition, the above terms are used only for the purpose of distinguishing one component from another.

It should be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise.

In the present application, it should be further understood that the terms "comprises," "includes," etc. specify the presence of stated features, integers, steps, operations, elements, components, or combinations thereof, but do not preclude the presence or addition of one or more other features, integers, steps, operations, elements, components, or combinations thereof. When a component, device, element, or the like of the present disclosure is described as having a purpose or performing an operation, function, or the like, the component, device, or element should be considered herein as being "configured to" meet that purpose or to perform that operation or function.

Further, terms "unit" or "control unit" forming part of the names of a hybrid control unit (HCU), a vehicle control unit (VCU), and etc. are merely terms that are widely used in the naming of a controller for controlling a specific function of a vehicle, and should not be construed as meaning a generic function unit. For example, each controller is a communication device that communicates with other controllers or sensors to control the function that is responsible for, a memory that stores an operating system or logic commands and input/output information, and one or more processor that performs determination, calculation, decision, and the like, which is desired for the control the function that is responsible therefor.

According to an embodiment of the present disclosure, it is proposed that a swappable battery can be additionally connected to an electrified vehicle together with a main battery electrically connected to a driving motor, thereby implementing output according to a driver demand power through the main battery and the swappable battery.

First, a configuration of the electrified vehicle according to an embodiment is described by referring to FIG. 1.

FIG. 1 is a block diagram illustrating an electrified vehicle equipped with a swappable battery according to an embodiment of the present disclosure.

Referring to FIG. 1, the electrified vehicle 100 comprises a swappable battery 110, a DC converter 120, a main battery 130, a power electric (PE) unit 140, a vehicle control unit (VCU) 150, a connector 160, a switch 170, and a main relay 180.

FIG. 1 is a view showing embodiments in terms of related components, it should be understood that an implementation of an actual vehicle may include additional components or fewer components than shown.

Hereinafter, each component is described below.

The swappable battery unit 110 may include a second battery 111, and a second battery management system (BMS) 112. The second BMS 112 may manage voltage, current, temperature, a state of charge (SOC), and a state of health (SOH) of the second battery 111, and may also control charging and discharging of the second battery 111. In addition, the second BMS 112 may set and manage the upper and lower limits of the SOC of the second battery 111, and may store information on cell type and rated capacity of the second battery 111. In addition, the second BMS 112 may transmit the information on the second battery 111 to the outside (i.e., the DC converter 120) through a predetermined vehicle communication protocol (e.g., controller area network, CAN). The second BMS 112 may receive a command on charging and discharging of the second battery 111. For convenience, the vehicle communication protocol may be assumed as the CAN communication in the following description, but it is apparent to those skilled in the art that the protocol may be replaced by other protocols, such as flexible data-rate (CAN-FD), and Ethernet.

Although not shown in FIG. 1, a cooling device such as an air-cooled fan for cooling the second battery in the swappable battery unit 110 may be provided. In this case, the second BMS 112 may control a state of the second battery 111 or the operation state according to the speed of vehicle. Of course, the swappable battery 110 may be implemented in a natural cooling method, and cooled by water cooling by disposing cooling pad through which coolant is circulated in a portion of the vehicle on which the swappable battery 110 is mounted.

Meanwhile, the swappable battery 110 may be mounted on a roof of the electrified vehicle, or accommodated in the space in the trunk or under the vehicle, or connected to the vehicle in a form of a trailer with a separate wheel provided, but this is exemplary and is not necessarily limited thereto.

The swappable battery 110 may be connected to the DC converter 120 through the connector 160. Here, being connected refers to as a high-voltage power cable and a CAN communication line are connected respectively. In addition, the connector 160 is connected to an input terminal of the DC converter 120, and an output terminal of the DC converter 120 may be connected to the main battery unit 130 in series.

The DC converter 120 may be a high DC-DC converter (HDC) type that steps up the voltage of the second battery 111 according to the voltage of the second battery 111, and may be a low DC-DC converter (LDC) type that steps down the voltage of the second battery 111. When assuming that the second battery 111 of the swappable battery unit 110 is smaller than that of the first battery 131 of the main battery unit 130, in other words, when assuming that as a low voltage/low capacity, the voltage of the second battery 111 may be stepped up which is provided as the HDC type.

In addition, the DC converter 120 may relay communications between the second BMS 112 of the swappable battery 110 and a first BMS 132 of the main battery 130, and may vary an output voltage by step up or step down the voltage of the voltage of the second battery 111 according to the target voltage command of the VCU 150.

In another embodiment, depending on the implementation of the electrified vehicle, the second BMS 112 may be directly connected to the VCU 150 without passing through the DC converter 120.

Further, an output terminal of the DC converter 120 may be connected to the main battery 130 in series, and allows to supply, by adding an output voltage of the DC converter 120 and an output voltage of the first battery 131 of the main battery 130, to a PE unit 140.

The main battery 130, as shown, may include the first battery 131 and the first BMS 132, and is fixedly mounted on the vehicle at all times.

The main battery 130 may be connected to the PE unit 140, and the PE unit 140 may include the motor and the inverter (not shown).

The VCU 150 may determine the required driving force based on an accelerator pedal position sensor (APS) value of the APS, determine the driving torque or regenerative braking torque to be output by the motor of the PE unit 140 and transmit the torque command to the motor controller (not shown) or an inverter (not shown). In addition, the VCU 150 may acquire the state information of each of the first battery 131 and the second battery 111 received from the first BMS 132 and the second BMS 112, and the DC converter 120 may acquire output voltage information of the DC converter 120, and the voltage verses output voltage efficiency information of the second battery 111. Here, the efficiency information for each output voltage according to the voltage of the second battery 111 may be prepared in a table, and the DC converter 120 may be prepared in advance to the VCU 150 instead of transmitted to the VCU 150.

In addition, the VCU 150 may determine an optimal efficiency voltage capable of operating the optimal efficiency of the PE system (e.g., the PE unit 140) and transmit a target voltage command corresponding thereto to the DC converter 120. In one embodiment, the VCU 150 may obtain a target voltage by subtracting the voltage of the first battery 131 from the optimum efficiency voltage or may obtain a target voltage by adding a predetermined margin from the voltage of the first battery 131 from the optimum efficiency voltage but is not limited thereto.

On the other hand, as shown in FIG. 1, a switch 170 may be disposed on high voltage power cables between the DC converter 120 and the main battery 130, and a main relay 180 may be provided on the high-voltage power cables between the main battery 130 and the PE unit 140.

In addition, the main battery 130 and the swappable battery 110 have upper limits of charging and discharging, respectively. Each of the upper limits of charging and discharging are not fixed values and may vary according to the state of charge (SOC) and an ambient temperature.

Figure 2:
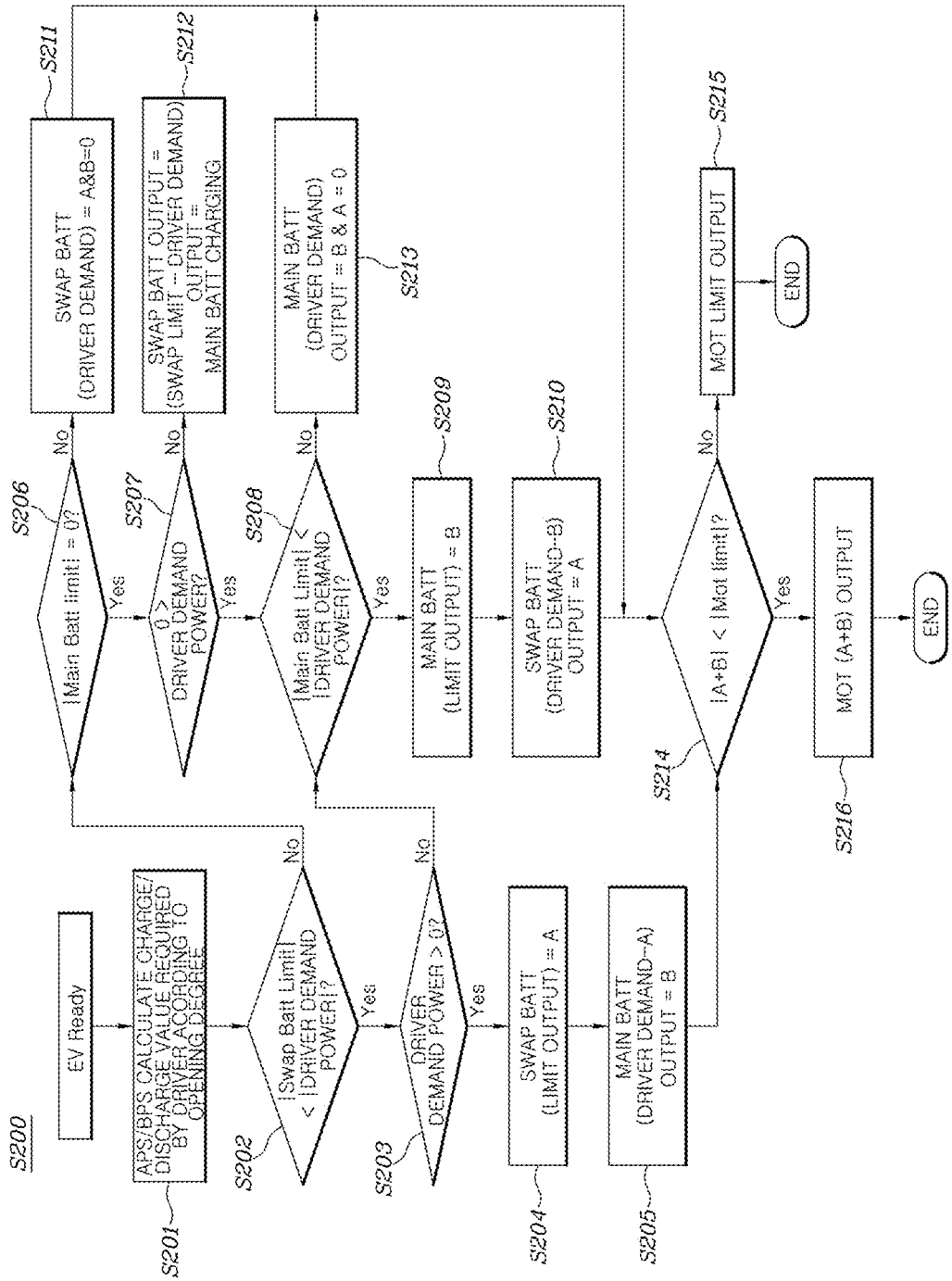
FIG. 2 is a flowchart illustrating a method of a power management for an electrified vehicle according to an embodiment of the present disclosure.

A power management method of an electric vehicle (S200) according to an embodiment based on the above-described vehicle configuration is described with reference to FIG. 2. In FIG. 2, the amount of charge and discharge of the main battery is indicated as "B", and the amount of charge and discharge of the swappable battery is indicated as "A".

FIG. 2 is a flowchart illustrating a method of a power management for an electrified vehicle (S200) according to an embodiment of the present disclosure.

Referring to FIG. 2, first, after the swappable battery 110 is connected and the engine is turned on (EV READY), the VCU 150 may determine the amount of charge and discharge of the driver demand in response to the pedal operation of the driver (S201). In more detail, as the driver presses the accelerator pedal harder, the value of accelerator position sensor (APS) increases. In addition, as the driver presses the brake pedal harder, the value of a brake position sensor (BPS) increases. Thus, according to the APS value or BPS value, the amount of charge and discharge demanded from the driver varies. Hereinafter, the amount of charge and discharge demanded from the driver is referred to as driver demand power. When the driver demand power exceeds 0, the PE unit 140 outputs the driving force, and when the driver demand power is less than 0, the PE unit 140 is generated.

Meanwhile, before describing a method of controlling charging and discharging the main battery 130 and the swappable battery 110 of the VCU 150, the charging and discharging priority of the main battery 130 and the swappable battery 110 of the VCU 150 is briefly described below.

When the PE unit 140 outputs the driving force, the VCU 150 may discharge the swappable battery 110 first. The swappable battery 110 is a second battery of the vehicle and can be replaced with another battery at any time as attaching and detaching of the battery can be performed freely, however, the main battery 130 is embedded in the vehicle and is not replaceable. Thus, it is desired in terms of battery management that the VCU 150 first discharges the swappable battery 110 and then discharge the non-replaceable main battery 130 later to satisfy the driver demand power. In addition, when the PE unit 140 operates, the VCU 150 may charge the main battery 130 first. It is desired in terms of battery management that the VCU 150 first charges the non-replaceable main battery 130 and then charge the swappable battery 110 later.

Hereinafter, the method for charging and discharging the main battery 130 of the VCU 150 and the swappable battery 110 is described in more detail.

First, it may be determined whether the driver demand power exceeds the upper limit of discharging of the swappable battery 110 (S202). If the driver demand power exceeds the upper limit of the swappable battery 110 (Yes in S202), it may not satisfy the driver demand power only with the output of the swappable battery 110. Accordingly, the VCU 150 discharges the swappable battery 110 as much as the upper limit of discharging (S204), and discharges the main battery 130 with respect to the output that is not discharged in the swappable battery 110, thereby satisfying the driver demand power.

Here, since the sum of the amount of discharging of the swappable battery 110 and the amount of discharging of the main battery 130 is the driver demand power, the amount of discharging of the main battery 130 is a value obtained by subtracting the upper limit of discharging of the swappable battery 110 from the driver demand power (S205).

In one embodiment, when the upper limits of discharging of the main battery 130 and the swappable battery 110 are 100 kW, respectively, and when the driver demand power of 200 kW is generated in a wide-open throttle (WOT) state, then, since the driver demand power, which is 200 kW, exceeds the upper limit of discharging of the swappable battery 110, which is 100 kW, the VCU 150 may discharge the swappable battery 110 by the upper limit of discharging. In addition, the VCU 150 may discharge the main battery 130 by 100 kW, which is a value obtained by subtracting the upper limit (i.e., 100 kW) of discharging of the swappable battery 110 from the driver demand power (i.e., 200 kW). Thus, the driver demand power may be satisfied.

The above-described discharging control of the main battery 130 and the swappable battery 110 of the VCU 150 is a case in which the driver demand power exceeds 0 and the PE unit 140 outputs the driving force (Yes in S203).

However, in the case of the PE unit 140 is generated (No in S203) when the driver demand power is less than 0, the VCU 150 charges the main VCU 150 as described below.

On the other hand, when the driver demand power is less than the upper limit of discharging of the swappable battery 110 (No in S202), the VCU 150 may discharge the swappable battery 110 alone to satisfy the driver demand power. The main battery 130 may determine whether charging and discharging is possible (S206). Here, a state in which the main battery 130 cannot be charged or discharged may include an over-temperature state of the battery. When it is determined that the main battery 130 is in a state charging and discharging is not possible (Yes in S206), the VCU 150 discharges the swappable battery 110 in response to the driver demand power, and the main battery 130 remains in a state not charged and discharged (S211). In addition, when the upper limit of discharging of the swappable battery 110 and the driver demand power are the same, the VCU 150 discharges only the swappable battery 110 by the upper limit of discharging to satisfy the driver demand power.

However, when it is determined that the main battery 130 in a state charging and discharging is possible (No in S206), the VCU 150 discharges the swappable battery 110 to the upper limit of discharging, and charges the main battery 130 with respect to the power that is additionally discharged in the swappable battery 110, thereby satisfying the driver demand power.

Here, since the sum of the amount of charging of the main battery 130 and the driver demand power is the amount of discharging of the swappable battery 110, the amount of charging of the main battery 130 is a value obtained by subtracting the driver demand power from the upper limit of discharging of the swappable battery 110 (S212). The swappable battery 110 may be discharged by the upper limit of discharging even when the driver demand power is less than the upper limit of discharging of the swappable battery 110, and the main battery 130 is charged by an additional amount of discharging of the swappable battery 110. The amount of charge for the main battery corresponds to a gap between the driver demand power and the upper limit of discharge of the swappable battery.

In one embodiment, when the upper limits of discharging of the main battery 130 and the swappable battery 110 are 100 kW, respectively, and when the driver demand power of 50 kW is generated, the driver demand power (i.e., 50 kW) is less than the upper limit (100 kW) of discharging of the swappable battery 110. Thus, the VCU 150 may discharge the swappable battery 110 by the upper limit of discharging. In addition, the VCU 150 may discharge the main battery 130 by 50 kW, which is a value obtained by subtracting the upper limit of discharging of the swappable battery 110, which is 100 kW, from the driver demand power, which is 50 kW. Thus, the main battery 130 may also be charged while satisfying the driver demand power. However, when the main battery 130 may not be charged by subtracting the driver demand power from the upper limit of discharging of the swappable battery 110, the VCU 150 may not discharge the swappable battery 110 by the upper limit of discharging.

The above-described charging control of the main battery 130 and the discharging control of the swappable battery 110 of the VCU 150 is a case in which the driver demand power exceeds 0 and the PE unit 140 outputs the driving force (No in S207).

Contrarily, in the case of the PE unit 140 generates when the driver demand power is less than 0 (Yes in S207), since the PE unit 140 needs the driver demand power as described below, the VCU 150 may determine whether the driver demand power exceeds the upper limit of charging of the main battery 130 (S208). If the driver demand power exceeds the upper limit of charging of the main battery 130 (Yes in S208), the driver demand power may not be satisfied only with charging the main battery 130. Accordingly, the VCU 150 charges the main battery 130 as much as the upper limit of discharging (S209), and charges the swappable battery 110 with respect to power that is not charged in the main battery 130, thereby satisfying the driver demand power.

Here, since the sum of the amount of charging of the main battery 130 and the amount of charging of the swappable battery 110 is the driver demand power, the amount of charging of the swappable battery 110 is a value obtained by subtracting the upper limit of charging of the main battery 130 from the driver demand power (S210).

In one embodiment, when the upper limits of charging of the main battery 130 and the swappable battery 110 are 100 kW, respectively, and when the driver demand power of −200 kW is generated, the driver demand power, which is −200 kW, exceeds the upper limit of charging of the main battery 130, which is −100 kW. Thus, the VCU 150 may charge the swappable battery 110 by the upper limit of charging. In addition, the VCU 150 may charge the main battery 130 by −100 kW, which is a value obtained by subtracting the upper limit of charging of the swappable battery 110, which is −100 kW from the driver demand power, which is −200 kW. Thus, the driver demand power may be satisfied.

In addition, when the driver demand power is less than the upper limit of charging of the main battery 130 (No in S208), since the VCU 150 may satisfy the driver demand power through charging of the main battery 130, the VCU 150 may charge the main battery 130 corresponding to the driver demand power (S213).

Then, the VCU 150 may determine whether the driver demand power exceeds the upper limit of output of the motor (S214). Thus, it may be determined that whether the PE unit 140 may actually output the driver demand power. When the driver demand power exceeds the upper limit of the motor (No in S214), since the PE unit 140 cannot satisfy the demand power, the output of the battery is limited to the upper limit of output of the motor (S215). However, when the driver demand power does not exceed the upper limit of output of the motor (Yes in S214), the PE unit 140 may satisfy all the driver demand power through the motor (S216).

According to embodiments described above, in a structure in which the swappable battery is additionally mounted on the main battery, may satisfy in various environments compared to a vehicle provided only a single battery by compensating for charging and discharging between a main battery and a swappable battery.

The present disclosure mentioned in the foregoing description may be implemented as code that can be written to a computer-readable recording medium and can thus be read by a computer system. The computer-readable medium may include all kinds of recording devices in which data readable by a computer system is stored. Examples of computer-readable medium includes hard disk drive (HDD), solid state disk (SSD), silicon disk drive (SDD), ROM, RAM, CD-ROM, magnetic tape, floppy disk, optical data storage device, and the like. Therefore, the above embodiments are therefore to be construed in all aspects as illustrative and not restrictive. The scope of the present disclosure should be determined by the appended claims and their legal equivalents, not by the above description, and all changes coming within the meaning and equivalent range of the appended claims are intended to be embraced therein.

DESCRIPTION OF REFERENCE NUMERALS

100: electrified vehicle
110: swappable battery
111: second battery
112: second battery management system (BMS)
120 DC converter
130 main battery
131 first battery
132 first battery management system (BMS)
140 power electric (PE) unit
150 vehicle control unit (VCU)
160 connector
170 switch
180 main relay

What is claimed is:

1. A method for power management of an electrified vehicle including: a power electric unit having a motor and an inverter, and a main battery and a swappable battery electrically connected to the power electric unit, the method comprising:
   determining a driver demand power;
   satisfying the driver demand power first with an output of the swappable battery when a power electric unit outputs a driving force based on an upper limit of discharging of the swappable battery; and
   charging the main battery first in response to the driver demand power when the power electric unit is generated based on an upper limit of charging of the main battery.

2. The method of claim 1, further comprising:
   when the driver demand power exceeds the discharging upper limit of the swappable battery and the power electric unit outputs the driving force,
   discharging the swappable battery by the upper limit of discharging; and
   discharging the main battery by a value obtained by subtracting the upper limit of discharging of the swappable battery from the driver demand power.

3. The method of claim 2, further comprising:
   determining whether the main battery is in a state of charging and discharging when the driver demand power is less than the discharge upper limit of the swappable battery.

4. The method of claim 3, further comprising:
   discharging the swappable battery in response to the driver demand power when determined that the main battery cannot be charged or discharged.

5. The method of claim 3, further comprising: when determined that the main battery is in a state of chargeable and not chargeable
   discharging the swappable battery to the upper limit of discharging; and
   charging the main battery by a value obtained by subtracting the driver demand power from the upper limit of discharging of the swappable battery.

6. The method of claim 1, further comprising:
   charging the main battery by the upper limit of charging, and charging the main battery by a value obtained by subtracting the upper limit of charging of the main battery from the driver demand power, when the driver demand power exceeds the upper limit of charging of the main battery when the power electric unit is generated.

7. The method of claim 6, further comprising:
charging the main battery in response to the driver demand power when the upper charge limit of the main battery is less than the driver demand power.

8. A non-transitory computer-readable recording medium having a program recorded thereon, the program to direct a processor to perform acts of:
determining a driver demand power of an electrified vehicle including: a power electric unit having a motor and an inverter, and a main battery and a swappable battery electrically connected to the power electric unit; and
satisfying the driver demand power first with an output of the swappable battery when a power electric unit outputs a driving force based on an upper limit of discharging of the swappable battery; and
charging the main battery first in response to the driver demand power when the power electric unit is generated based on an upper limit of charging of the main battery.

9. An electrified vehicle comprising:
a power electric unit having a motor and an inverter;
a main battery and a swappable battery electrically connected to the power electric unit; and
a vehicle control unit configured to:
determine a driver demand power,
satisfy the driver demand power first with an output of the swappable battery when a power electric unit outputs a driving force based on an upper limit of discharging of the swappable battery; and
charge the main battery first in response to the driver demand power when the power electric unit is generated based on an upper limit of charging, of the main battery.

10. The electrified vehicle of claim 9, wherein when the driver demand power exceeds the discharging upper limit of the swappable battery when the power electric unit outputs the driving force, the vehicle control unit is configured to:
discharge the swappable battery by the upper limit of discharging; and
discharge the main battery by a value obtained by subtracting the upper limit of discharging of the swappable battery from the driver demand power.

11. The electrified vehicle of claim 10, wherein the vehicle control unit is configured to determine whether the main battery is in a state of charging and discharging when the driver demand power is less than the discharge upper limit of the swappable battery.

12. The electrified vehicle of claim 11, wherein the vehicle control unit is configured to discharge the swappable battery in response to the driver demand power when determined that the main battery cannot be charged or discharged.

13. The electrified vehicle of claim 11, wherein when determined that the main battery is in a state of chargeable and not chargeable, the vehicle control unit is configured to:
discharge the swappable battery to the upper limit of discharging; and
charge the main battery by a value obtained by subtracting the driver demand power from the upper limit of discharging of the swappable battery.

14. The electrified vehicle of claim 9, wherein the vehicle control unit is configured to charge the main battery by the upper limit of charging and charges the main battery by a value obtained by subtracting the upper limit of charging of the main battery from the driver demand power when the driver demand power exceeds the upper limit of charging of the main battery when the power electric unit is generated.

15. The electrified vehicle of claim 14, wherein the main battery is charged in response to the driver demand power when the upper charge limit of the main battery is less than the driver demand power.

16. The electrified vehicle of claim 9,
wherein the vehicle control unit is configured to determine whether the driver demand power exceeds the upper limit of output of the motor,
wherein the power electric unit is configured to output the upper limit of the motor when the driver demand power exceeds the upper limit of output of the motor.

* * * * *